US009100120B1

(12) United States Patent
Friskney et al.

(10) Patent No.: US 9,100,120 B1
(45) Date of Patent: Aug. 4, 2015

(54) METHODS AND APPARATUS FOR DETERMINING A PATH IN A COMMUNICATIONS NETWORK

(75) Inventors: Robert Friskney, Harlow (GB); Fiona Davis, Bishops Stortford (GB); Nigel Baker, Harlow (GB); Christopher Phillips, Hutton (GB); Song Dong, Egham (GB)

(73) Assignee: Ciena Corporation, Hanover, MD (US)

( * ) Notice: Subject to any disclaimer, the term of this patent is extended or adjusted under 35 U.S.C. 154(b) by 1903 days.

(21) Appl. No.: 10/675,760

(22) Filed: Sep. 30, 2003

(51) Int. Cl.
*H04B 10/25* (2013.01)

(52) U.S. Cl.
CPC ..................... *H04B 10/25* (2013.01)

(58) Field of Classification Search
USPC ................................ 398/25, 49, 57
See application file for complete search history.

(56) References Cited

U.S. PATENT DOCUMENTS

| | | | | |
|---|---|---|---|---|
| 5,680,325 | A * | 10/1997 | Rohner | 709/220 |
| 6,438,110 | B1 * | 8/2002 | Rai et al. | 370/254 |
| 6,555,457 | B1 * | 4/2003 | Derkits et al. | 438/597 |
| 6,563,811 | B2 * | 5/2003 | Hansen et al. | 370/338 |
| 6,912,221 | B1 * | 6/2005 | Zadikian et al. | 370/395.21 |
| 7,046,930 | B2 * | 5/2006 | Kawarai | 398/27 |
| 7,120,689 | B2 * | 10/2006 | Gonsalves et al. | 709/224 |
| 7,180,854 | B2 * | 2/2007 | Cambron | 370/227 |
| 7,421,509 | B2 * | 9/2008 | Lolayekar et al. | 709/235 |
| 2002/0089964 | A1 * | 7/2002 | Hansen et al. | 370/341 |
| 2003/0016411 | A1 * | 1/2003 | Zhou et al. | 359/110 |
| 2004/0073436 | A1 * | 4/2004 | Vaishnavi | 705/1 |
| 2004/0246973 | A1 * | 12/2004 | Hoang et al. | 370/395.21 |

FOREIGN PATENT DOCUMENTS

WO      WO 02/103948 A1 * 12/2002 ............. H04J 14/02

OTHER PUBLICATIONS

N. Golmie et al., "A Differentiated Optical Services Model for WDM Networks", IEEE Communications Magazine, Feb. 2000.*
A. Dana et al., "A Traffic Splitting Restoration Scheme for MPLS Network Using Case-Based Reasoning", APCC 2003, Sep. 21-24, 2003.*
B. Rawat et al., "A New Neural Network Approach for Virtual Topology Design of Multihop Optical Networks", IEE 1998.*
D. Hunter et al., "Dynamic Routing Rearrangement, and Defragmentation in WDM Ring Networks", Optical Fiber Communication Conference 2000, Mar. 7-10, 2000.*
OIF, "User Network Interface (UNI) 1.0 Signaling Specification", Oct. 1, 2001.*
Leake, Case-Based Reasoning: Experience, Lessons, and Future Directions, AAAI Press/MIT Press, 1996, Chapter 1, pp. 1-35.
ESANN 2003: Bruges, Belgium, The European Symposium on Artificial Neural Networks 2003, seven pages.

* cited by examiner

*Primary Examiner* — Shi K Li
(74) *Attorney, Agent, or Firm* — Clements Bernard PLLC; Christopher L. Bernard; Lawrence A. Baratta, Jr.

(57) ABSTRACT

Typically paths are provisioned in a network with a margin which allows for component variations and failures in the network and so on. By providing more information about the requirements of the link in a path request, it is possible to more efficiently calculate a route for the path through the network. The efficiency gain allows greater network utilization which in turn saves costs for the network service provider.

44 Claims, 4 Drawing Sheets

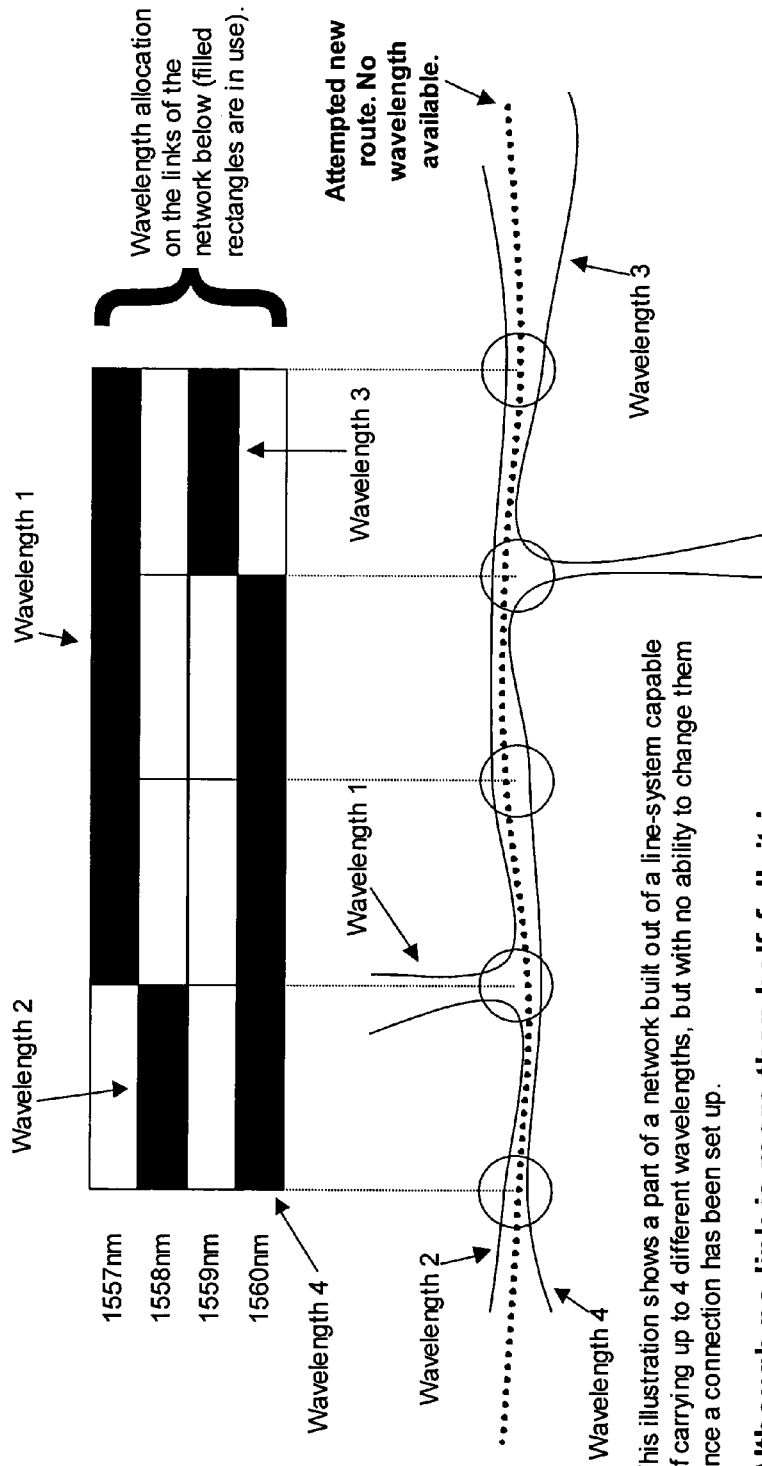

METHODS AND APPARATUS FOR DETERMINING A PATH IN A COMMUNICATIONS NETWORK

FIELD OF THE INVENTION

This invention relates to a method of determining a path in a communications network in response to a path setup request including parameters which specify characteristics relating to a service level requirement for the path, and to corresponding apparatus and software.

BACKGROUND OF THE INVENTION

When users wish to communicate across a communications network such as an optical network, it is necessary for a path to be provisioned through the network between the two desired end points at the user locations. Thus a typical first step in setting up a connection between the users would be to issue a path set up request to the control layer of the network. Typically such a request would include information about the start and end locations of the path, and the kind of path required for example, and the bandwidth requirement. The request may also specify the type of protection which is required i.e. the method which is used to provide an alternative path should the primary path fail.

The control layer of the network then proceeds to determine whether a path between the start and end points is available and if so what is the optimum path.

Clearly the routing algorithm for the path should attempt to determine an optimum route taking into account factors such as routing policies set by the network management layer, available links, or any existing traffic on links and available capacity on those links and the resilience of those links particularly with reference to the desired protection (for example are the links following a shared path). These constraints are typical for all networks.

For analogue networks such as optical networks however, additional constraints must be taken into account. For example, ageing of components and fibres must be taken into account and margin built into the system to allow for these effects during the lifetime of the path, when provisioning the path.

Thus, for example with reference to FIG. 1, in an optical network, a margin of several dB, (maybe of the order of 12 dB), must be left to allow for degradation of the signal in the analogue domain. Typical components of the margin break down into random effects such as polarisation mode dispersion (PMD) and polarisation mode loss (PML), configuration tolerances such as optical signal to noise ratio (OSNR) equalisation mismatch, and long term OSNR degradation, component characteristics such as ageing of components and potential fibre losses such as normal signal degradation with length of transit in fibre and an allowance for losses through in service splicing of the fibre. These margins must all be added together to provide a total system margin which must be built into the path during routing.

Particularly initially, these margins are, to some extent and for some wavelengths, unused. Thus, additional equipment, especially regenerators, has been inserted into the network and gives no immediate benefit. Indeed, calls may be routed less-directly than they need to be in order to go via a regenerator site.

Thus in a typical network, the network must effectively be over-provisioned with unused capacity in order (amongst other things) to ensure that these margins and appropriate protection paths are in place. Furthermore, the network has little flexibility in how to provision the path. For, example in addition to over provisioning, the path setup request typically will force the network to use a particular type of protection which may not be appropriate for the current network state. It will be understood that any steps that may be taken to improve network utilisation (i.e. to reduce the requirement for overprovisioning) will provide cost benefits since the financial return produced from a particular investment in network equipment can be improved.

SUMMARY OF THE INVENTION

In accordance with a first aspect of the invention there is provided a method of determining a route for a connection across an optical communications network comprising:—(a) receiving data specifying a service level requirement for the connection, (b) determining an optical signal margin requirement on the basis of the service level requirement, and (c) determining a route to use when provisioning the connection dependent on the determined optical signal margin requirement.

In accordance with a second aspect of the invention there is provided a method of determining a route for a connection across a communications network comprising receiving data specifying a service level requirement for the connection and determining a route on the basis of the service level requirement, the service level requirement being selected from a group containing a required longevity for the connection, a required resiliency for the connection, a required bit error rate for the connection, a required maximum duration of outage for the connection and a required maximum time before the connection can be provisioned.

In accordance with a third aspect of the invention there is provided a method of routing a path in a communications network comprising receiving a path setup request, the path setup request including a plurality of parameters which specify characteristics of the desired path and which include at least one parameter relating to a service level requirement for the path.

Preferably, the path setup request does not specify a protection technique. This allows the protection technique to be chosen by they network based on the user requirements (as specified in the path setup request) and the network information. Because this improves flexibility, this may well provide at least as good protection as the user expects but at lower network cost.

The plurality of parameters may for example specify the longevity of the connection which in turn (and as described in more detail below) allows a less conservative OSNR link margin to be applied. For example, with reference again to FIG. 1, the component ageing and in-service splice margins may be reduced for a shorter term path since these effects will have little impact for a short term path.

Other parameters passed with the path request may include resiliency, typically in terms of a maximum outage period and/or an outage occurrence rate per annum. These parameters allow the network to recognise a path which can easily be re-routed compared to a path (for example with a very short permitted outage time) which cannot easily be re-routed "on the fly". Reduced flexibility and re-routing (as explained below) increases the cost of carrying the path since it may result in non-optimal use of the network for other paths.

Another parameter typically specified is the bit error rate (BER). Using this information in a routing algorithm allows further adjustments to be made to the link margin since the OSNR is usually the deciding factor in producing a ceiling for the BER. A reduced BER requirement allows a reduced OSNR margin to be applied to a particular path.

Another parameter which may be considered during path set up is an execution delay for provisioning the route. A carefully calculated route taking full account of all parameters may take several days to provision and even a typical provisioning time will be several hours. However, it may be necessary to provision a route within a few fractions of a second. These factors may be taken into account when deciding how to calculate the route as explained below. Generally, short provisioning times equate with inefficient (and therefore expensive) provisioning.

In another aspect, the invention provides a processor for a communications network arranged to provision a path through the network in response to a path setup request, the processor being further arranged to accept a path setup request including a plurality of parameters which specify characteristics of the desired path and which include at least one parameter relating to a service level requirement for the path.

In a further aspect the invention provides a communications network including a processor arranged to provision a path through the network in response to a path setup request, the processor being further arranged to accept a path setup request including a plurality of parameters which specify characteristics of the desired path and which include at least one parameter relating to a service level requirement for the path.

In a yet further aspect the invention provides a computer program which when executed on a processor in a communications network causes the processor to establish a path in the communications network in response to a path setup request, the path setup request including a plurality of parameters which specify characteristics of the desired path and which include at least one parameter relating to a service level requirement for the path.

Other aspects and features of the present invention will become apparent to those ordinarily skilled in the art upon review of the following description of specific embodiments of the invention in conjunction with the accompany figures.

BRIEF DESCRIPTION OF THE DRAWINGS

FIG. 4 is a schematic diagram showing wavelength provisioning across a network.

DETAILED DESCRIPTION OF THE INVENTION

Figure 2:
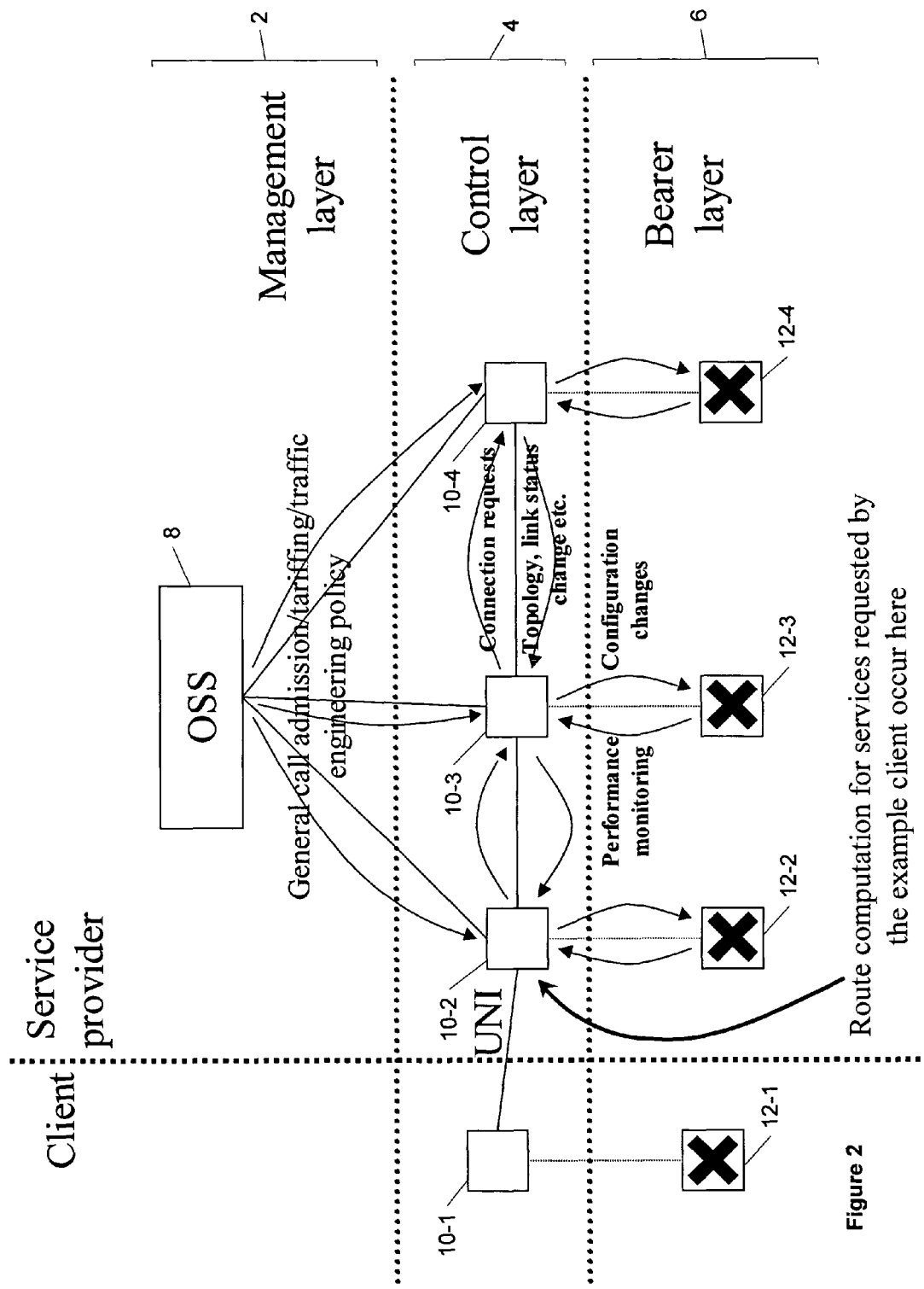
FIG. 2 is a schematic block diagram showing a typical network management configuration.

With reference to FIG. 2, a typical network may have a management layer 2, a control layer 4 and a bearer layer 6. It will be appreciated that the logical separation of the network into these layers is somewhat arbitrary and that in practice parts of the control layer may be distributed, for example, between the bearer layer and the management layer. Nevertheless, for ease of explanation, these functions will be considered to be separate layers in the description below.

The management layer 2 typically contains an operations support system (OSS) 8 which carries out the co-ordination network functions by providing overall policy information to nodal controllers 10-1 to 10-4 in the control layer, and other functions such as monitoring for faults and locating faults.

The control layer has a plurality of nodal controllers 10-1 to 10-4 which share information such as link topology updates, available resources and physical layer analogue optical parameters (in an optical network). Nodal controllers typically also act as "owner" of the link resources of their nodes and are typically integrated with switching/terminal elements in the bearer layer. Nodal controllers carry out routing algorithms and are able to make the final "decision" to determine whether or not the node resources can be allocated to a new path.

In the bearer layer 6, switching/terminal facilities 12-1 to 12-4 are provided for provisioning purposes by the nodal controllers. It is through these elements that the data actually flows to traverse the network once a path has been created. The bearer layer interacts with the control layer in both directions. The bearer layer performs measurements of the network performance and notifies the control layer of information such as link failures and current signal quality of all or a subset of existing connections. In the other direction, configuration changes are sent from the control layer to the bearer layer to adjust, tear down or set up new paths.

Figure 1:
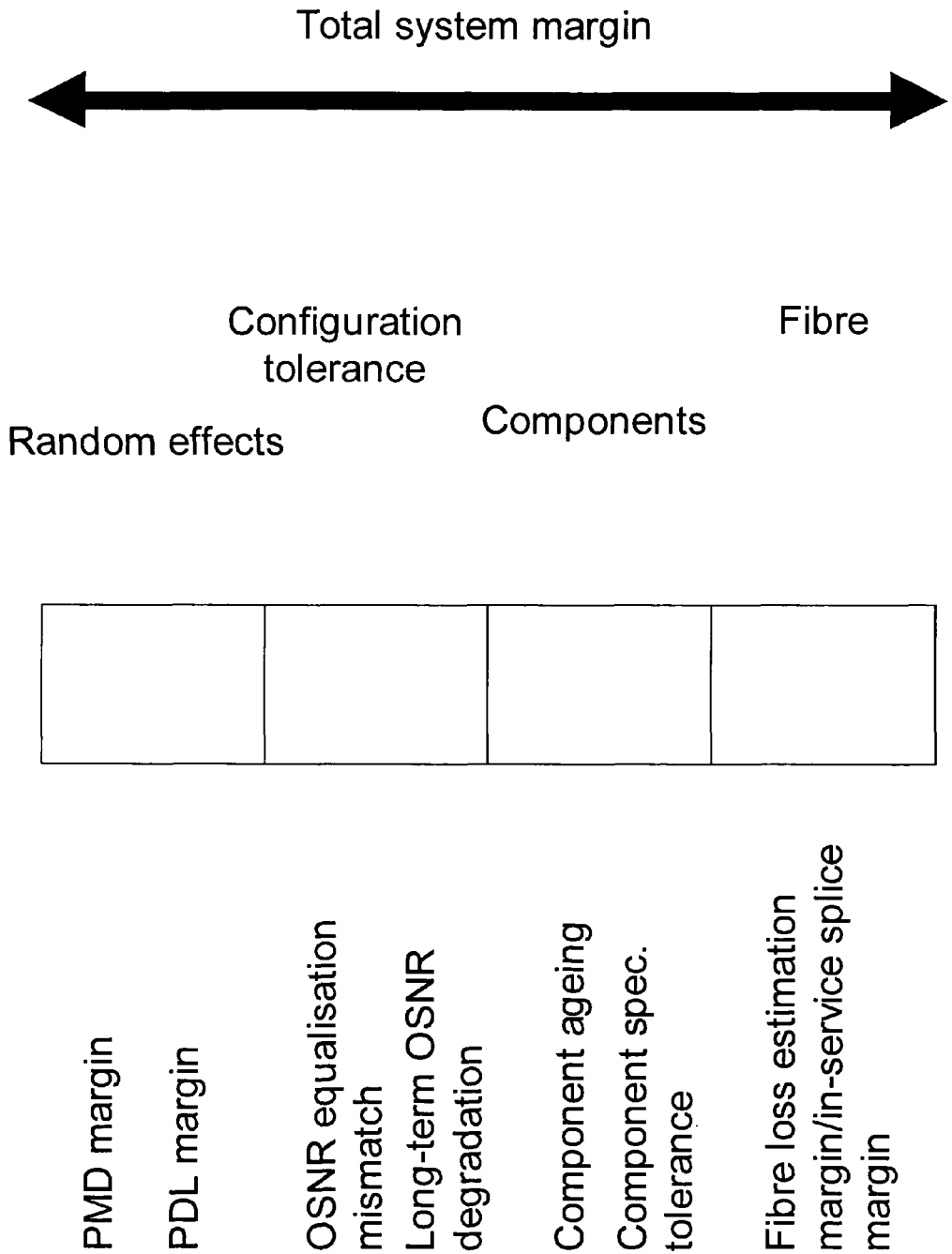
FIG. 1 is a schematic diagram showing parameters which are typically taken into account when designing margin in a communications path.

In order to set up a path, typically a user will provide a path setup request to a local nodal controller such as the controller 10-1 of FIG. 1. The control layer uses its knowledge of the current state of the network to carry out routing. Typically a routing algorithm will execute in the nodal controller 10-1 based on information provided in the path setup request, information provided by other nodal controllers and information provided by the nodal controllers associated bearer layer fabric 12-1. Having determined a suitable path, (or a plurality of paths which need testing), information is communicated to the other nodes in the control layer to set up the path using the elements available in the bearer layer.

Figure 3:
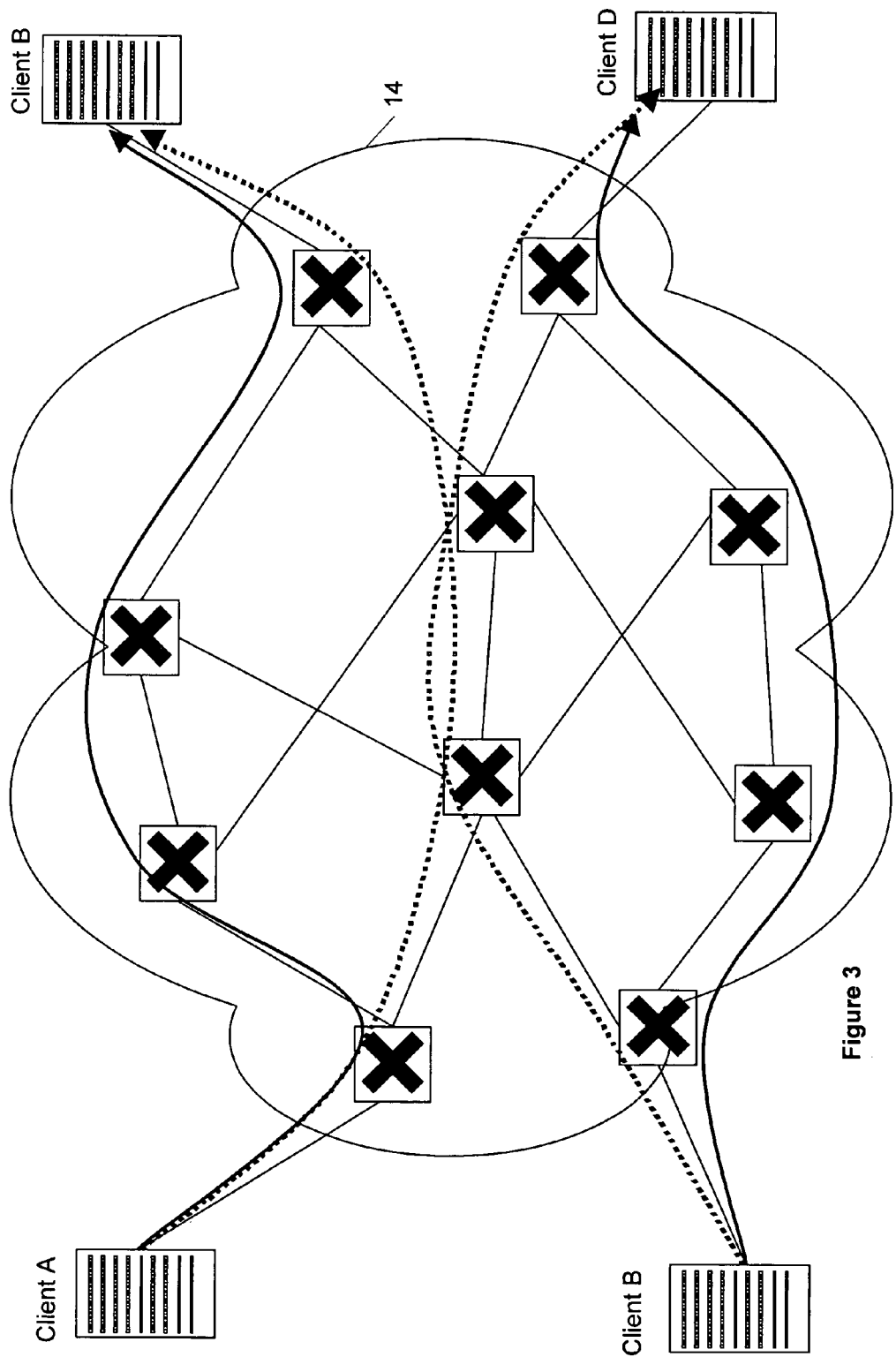
FIG. 3 is a schematic diagram showing potential routes between clients in a network.

Thus with reference to FIG. 3, the control layer may achieve provisioning of routes (solid lines) between clients A and B and between clients C and D via the network 14. Additionally, protection paths (dotted lines) may be provisioned using alternative elements in the bearer layer in order to provide some redundancy should the primary (solid line) routes fail.

Thus far, what has been described is generally conventional. However, by modifying the path setup request to include additional information which is not conventionally included, the routing algorithm may be made to provide more efficient network utilisation as described below.

Some of the possible parameters passed to the control layer and advantages conferred on the functioning of the routing algorithm are set out below.

Longevity and Network Fragmentation

The provision of a longevity parameter (i.e. an anticipated length during which the path is required) provides several advantages.

Firstly, in an analogue network such as an optical network, a path which is to be provisioned for a relatively short time does not need a large margin to allow for ageing of components in the network. A reduced noise margin allows more signals to be put onto the same portion of the network thereby increasing network utilisation or allows a lower quality (cheaper) set of links to be used.

Secondly, if a link is to be deprovisioned very quickly the margin provided in the link budget to ensure that the link will only suffer a small amount of drop out/disruption permitted within a service level requirement may be reduced since the probability of disruption, for example from connections added later, reduces with duration of the link. It will be noted that this requires the desired resilience of the link (as explained in more detail below) also to be provided within the path setup request.

Having knowledge of the longevity also allows long term connections to be routed along the shortest or most direct paths in order to avoid over using network capacity and also to ensure efficient long-term resource utilisation to reduce network fragmentation. Short term paths are not relevant to long term resource usage unless they cause a long term path to be sub-optimally routed.

Thus longevity of the link may be used to improve network utilisation by keeping the short terms paths away from popular links which are good for providing the best routing for longer term paths.

This may be achieved by providing a link weighting which includes a "path_time_to_live" parameter. For example, cost (link, path time to live)=cost (link)^(1 over path time to live). Thus by making more congested links weighted more heavily the relative distinction in weightings is increased so that longer term links cost less to put on popular routes.

If the path request also contains a maximum permissible latency parameter, short term paths may be constrained from being caused to be routed through tortuous paths in order to meet the weighting constraints described above.

Resiliency and r Source Fragmentation

The resiliency parameter may be used to overcome the problem of resource fragmentation on links in the network.

This problem occurs when there is a resource continuity requirement such as in the example shown in FIG. 4. In this optical network, unless wavelength converters are used (which are expensive) a wavelength service within a wavelength routed optical network will be of the same frequency/wavelength throughout all of the node-node hops that it traverses. This is a significant constraint when trying to find a possible route for such a wavelength.

In FIG. 4, four wavelength services are shown, wavelength 1, wavelength 2, wavelength 3, wavelength 4. It will be noted that approximately half the network resources are being used and yet it is not possible to provision a fifth service across all links of the network.

In order to provision a fifth service, it is either necessary to re-arrange some of the existing traffic, potentially causing service interruption (for example moving wavelength 1 to be at 1558 nm) or a wavelength converter function must be inserted (for example allowing the new service to be transmitted at 1559 nm and converted to 1558 nm anywhere after the first link). Clearly the provision of a wavelength converter increases the cost of provisioning the link.

Sensitivity to Outages

By including information concerning the sensitivity of a particular path to outages, for example, in terms of maximum duration of outage and repetition rate of outages, it is possible to determine whether links may be moved to defragment the network to provide additional capacity. Furthermore, the number of times each link can be moved may be deduced. The choice of movements used to perform the defragmentation may be arranged to take advantage of this.

Additionally, a path which is known to be tolerant to outages may be protected more easily with a protection path since protection paths may be rearranged as each fault occurs to ensure that every path is still protected. This allows increased sharing of protection paths between links.

BER

By including a BER parameter in the path request, it is possible to reduce the noise margin since the OSNR typically has a direct bearing on achievable BER. With knowledge of the BER, it is possible to tune the likely OSNR of a provisioned path to ensure that the BER is met. A high permissible BER may allow a reduced OSNR margin. Knowledge of a desired BER may also allow other parameters to be adjusted such as the power of adjacent wavelengths (which may have an impact on non-linear distortion of the wavelength of interest).

Execution Delay for Provisioning

By specifying in the path request how long the network may take before provisioning the path, it is possible to further optimise the cost of provisioning. For example, switches which may be configured quickly may need to be used for a path which must be provisioned quickly whereas slow switches (which would typically be cheaper) may be used for paths having a lower requirement in this respect.

As a further alternative, a network may be provisioned with sites for items such as optical regenerators which are not installed until actually required. Other articles suitable for this treatment may be channel filters or band or group filters etc.

During automatic route calculation, these "virtual items" may be treated as if they exist and if they are used in the route may cause a work order to be issued for the additional items to be provisioned.

Knowing how quickly the path must be established and knowing how long it would take to provision such virtual items, allows the use or otherwise of these items. Also, knowing the longevity of the path allows the automatic routing algorithm to take this into account. Clearly it is unlikely to be economically viable to provision a new item such as a regenerator for a path which is only required for a few days.

The virtual items may also have several sub-classes. For example, a virtual item may be one which can be provisioned using equipment which the carrier has in stock. Alternatively, a virtual item may be flagged as provisionable using equipment that the carrier needs to order. Clearly the second sub classification will take longer to provision than the first.

This allows the initial investment in the network to be minimised and additional investment to be focussed on parts of the network where it is required based on path requests.

Furthermore, it might be possible to roll over badly provisioned paths on to new equipment to more optimally route the path over time, for example by using different links or using different more cost effective elements in the bearer layer.

Tarriffinq

The control layer may also feed information to the management layer to enable a client to be charged more for different types of path requests. For example, for a path which must be provisioned quickly is likely to be more expensive than a path which can be provisioned more efficiently by taking more time in the route calculation. A path which is required for a longer time may also cost more and clearly a path which requires less resilience (and may therefore be more flexibly routed and re-routed or carried on cheaper equipment) is likely to cost less.

These factors may be considered by the routing algorithm to generate pricing information to be fed back to the management layer. This may be used for example to set a price to be offered to a customer by assessing the actual cost and then adding a suitable profit margin.

Alternatively, this information may be used to cause charging to occur according to a tariff pre-agreed with a customer. An exemplary basis for this might be cost=B*F*D where B is a basic cost, F is a factor for increasing the price for fast provisioning if required and D is a discount factor for reducing the price if the connection is not required for a long period.

Implementation

The control layer may also take action if, for example, a path remains provisioned beyond its projected longevity parameter. For example, the path may automatically be deprovisioned, may be reprovisioned along another route or may have its SLA downgraded so that it is allowed to be subject to increased outages for example.

The routing algorithm is typically implemented using software executing somewhere in the network. The software may operate using neural network techniques and/or using case based reasoning techniques. The inputs to these techniques may be the raw and/or pre-processed path request parameters.

The invention claimed is:

1. A method of provisioning a route across an optical communications network, comprising:
   receiving, at a nodal controller, data from a user specifying a service level requirement including one or more parameters for a connection across the optical communications network, wherein the one or more parameters include a parameter relating to longevity of the route and wherein the longevity parameter is used to determine an optical signal margin requirement,
   determining the optical signal margin requirement on the basis of the one or more parameters, the optical signal margin requirement being the margin that is allowed for degradation of an optical signal carrying data over the connection,
   determining a route to use for the connection, the route being determined using the determined optical signal margin requirement;
   provisioning the route across the optical communications network by the nodal controller controlling a switch; and
   wherein the longevity parameter is used to selectively weight different links in the optical communications network.

2. The method according to claim 1, wherein the one or more parameters include a parameter relating to an acceptable delay for provisioning the route.

3. The method according to claim 2, wherein the provisioning delay parameter is used to determine which network elements to use in provisioning the route.

4. The method according to claim 2, wherein the provisioning delay parameter is used to determine whether to install new equipment in the network to provision the route.

5. The method according to claim 1, wherein the one or more parameters include a parameter relating to resilience of the route.

6. The method according to claim 5, wherein the resilience is specified in terms of a maximum outage duration.

7. The method according to claim 5, wherein the resilience is specified in terms of a minimum period between outages.

8. The method according to claim 5, wherein the resilience is specified in terms of a maximum number of outages in a predetermined period.

9. The method according to claim 1, wherein the one or more parameters include a parameter relating to a required worst case bit error rate of a signal carried on the route.

10. The method according to claim 1, wherein the route is provisioned using neural networking techniques and wherein the neural network is fed with at least one of the said plurality of parameters.

11. The method according to claim 1, wherein the route is provisioned using case-based reasoning techniques and wherein the reasoning algorithm is fed with at least one of the said plurality of parameters.

12. A method of provisioning a route across a communications network, comprising:
   receiving, at a nodal controller, data from a user specifying a service level requirement including a plurality of parameters for a connection across the communications network,
   determining a route for the connection on the basis of the plurality of parameters, the plurality of parameters including a required longevity used to determine a signal margin requirement and at least one further parameter selected from a group consisting of a required resiliency for the connection, a required bit error rate for the connection, a required maximum duration of outage for the connection and a required maximum time before a route for the connection can be provisioned,
   provisioning the route across the communications network by the nodal controller controlling a switch, and
   wherein the required longevity parameter is used to selectively weight different links in the communications network.

13. The method according to claim 12, wherein the service level requirement includes a required maximum provisioning time and wherein different switches in the network are considered during determination of the route dependent on the maximum provisioning time.

14. The method according to claim 12, wherein the service level requirement includes a required maximum provisioning time and wherein different network topologies are considered during determination of the route dependent on the maximum provisioning time.

15. A method of routing a path in a communications network, comprising:
   receiving, at a nodal controller, a path setup request from a user, the path setup request including a plurality of parameters which specify characteristics of the desired path and which include at least one parameter relating to a service level requirement for the path, wherein the path setup request includes a parameter relating to longevity of the path that is used to selectively allow a reduced noise margin to be applied during routing calculations,
   determining a protection technique for use when establishing the path based on at least one of the plurality of parameters other than a parameter specifying a protection technique, and
   establishing the path across the communications network by the nodal controller controlling a switch; and
   wherein the longevity parameter is used to selectively weight different links in the communications network.

16. The method according to claim 15, wherein the longevity parameter is used to selectively weight different links in the network.

17. The method according to claim 15, wherein the path setup request includes a parameter relating to an acceptable delay for provisioning the path.

18. The method according to claim 17, wherein the provisioning delay parameter is used to determine which network elements to use in provisioning the path.

19. The method according to claim 17, wherein the provisioning delay parameter is used to determine whether to install new equipment in the network to provision the path.

20. The method according to claim 15, wherein the setup request includes a parameter relating to resilience of the path.

21. The method according to claim 20, wherein the resilience is specified in terms of a maximum outage duration.

22. The method according to claim 20, wherein the resilience is specified in terms of a minimum period between outages.

23. The method according to claim 20, wherein the resilience is specified in terms of a maximum number of outages in a predetermined period.

24. The method according to claim 20, including using the resiliency parameter to determine whether a link may be moved to defragment the network to provide additional capacity.

25. The method according to claim 24, wherein the resiliency parameter is used to determine a maximum number of times the moved link can be moved.

26. The method according to claim 15, wherein the setup request includes a parameter relating to a required worst case bit error rate of a Signal carried on the path.

27. The method according to claim 15, wherein the path is provisioned using neural networking techniques and wherein the neural network is fed with at least one of the said plurality of parameters.

28. The method according to claim 15, wherein the path is provisioned using case-based reasoning techniques and wherein the reasoning algorithm is fed with at least one of the said plurality of parameters.

29. A method of routing a path across a communications network, comprising:
receiving, at a nodal controller, a path setup request from a user containing resiliency information relating to a sensitivity of the path to outages;
using the resiliency information to determine whether a link in the path may be moved during its lifetime in order to defragment the network to provide additional capacity; and
moving the link across the communications network by the nodal controller controlling a switch and dependent upon the resiliency information and a maximum number of times the link may be moved; and
wherein the path setup request includes a parameter relating to longevity of the path that is used by the processor to selectively weight different links in the communications network.

30. The method according to claim 29, wherein the resiliency information is used to determine the maximum number of times the link may be moved.

31. A processing apparatus for an optical communications network comprising:
a nodal controller configured to
accept a path setup request including a plurality of parameters which specify characteristics of a desired path,
receive network information from the communications network, process the path setup request and the network information to generate a route for the desired path,
process at least one of the plurality of parameters in the path setup request other than a parameter specifying a protection technique and the network information to generate a suitable protection path for the route, and
wherein the path setup request includes a parameter relating to longevity of the path that is used by the processor to selectively weight different links in the communications network.

32. The processing apparatus according to claim 31, wherein the path setup request does not include parameters which specify a particular protection technique.

33. The processing apparatus according to claim 31, wherein the longevity parameter is used by the processor to allow a reduced noise margin to be applied during routing calculations.

34. The processing apparatus according to claim 31, wherein the setup request includes a parameter relating to an acceptable delay for provisioning the path.

35. The processing apparatus according to claim 34, wherein the provisioning delay parameter is used by the processor to determine which network elements to use in provisioning the path.

36. The processing apparatus according to claim 34, wherein the provisioning delay parameter is used by the processor to determine whether to install new equipment in the network to provision the path.

37. The processing apparatus according to claim 31, wherein the setup request includes a parameter relating to resilience of the path.

38. The processing apparatus according to claim 37, wherein the resilience is specified in terms of a maximum outage duration.

39. The processing apparatus according to claim 37, wherein the resilience is specified in terms of a minimum period between outages.

40. The processing apparatus according to claim 31, wherein the path setup request includes a parameter relating to the maximum bit error rate of a signal carried on the path.

41. The processing apparatus according to claim 31, wherein the processing apparatus is further configured to use neural networking techniques to route the path and wherein a neural network is fed with at least one of the said plurality of parameters.

42. The processing apparatus according to claim 31, wherein the processing apparatus is further configured to use case-based reasoning techniques to route the path and wherein a reasoning algorithm is fed with at least one of the said plurality of parameters.

43. A communications network comprising:
a processor configured to
accept a path setup request including a plurality of parameters which specify characteristics of a desired path,
receive network information from the communications network,
process the path setup request and the network information to generate a route for the desired path,
process at least one of the plurality of parameters in the path setup request other than a parameter specifying a protection technique and the network information to generate a suitable protection path for the route, and
wherein the path setup request includes a parameter relating to longevity of the path that is used by the processor to selectively weight different links in the communications network.

44. A non-transitory computer readable medium comprising:
at least one instruction executable on a processor to establish a path in response to a path setup request, the path setup request including a plurality of parameters which specify characteristics of the path,
at least one instruction executable on the processor to receive network information from the communications network,
at least one instruction executable on the processor to process the path setup request and the network information to generate a route for the path,
at least one instruction executable on the processor to process at least one of the plurality of parameters in the path setup request other than a parameter specifying a protection technique and the network information to generate a suitable protection path for the route, and
wherein the path setup request includes a parameter relating to longevity of the path that is used by the processor to selectively weight different links in the communications network.

* * * * *